United States Patent [19]

Hwang

[11] Patent Number: 5,191,421
[45] Date of Patent: Mar. 2, 1993

[54] AUTOMATIC SCREEN CONDITION CONTROL CIRCUIT IN TELEVISION SET

[75] Inventor: Joo C. Hwang, Seoul, Rep. of Korea

[73] Assignee: Samsung Electronics Co., Ltd., Suwon, Rep. of Korea

[21] Appl. No.: 701,825

[22] Filed: May 17, 1991

[30] Foreign Application Priority Data

Aug. 31, 1990 [KR] Rep. of Korea .................. 90-13690

[51] Int. Cl.$^5$ ............................................ H04N 5/235
[52] U.S. Cl. .................................... 358/168; 358/219; 358/28
[58] Field of Search .................. 358/169, 168, 219, 17, 358/28, 29, 30

[56] References Cited

U.S. PATENT DOCUMENTS

| | | | |
|---|---|---|---|
| 4,404,593 | 9/1983 | Shanley, II et al. | 358/168 |
| 4,521,811 | 6/1985 | Stoughton et al. | 358/168 |
| 4,587,554 | 5/1986 | Tamura et al. | 358/169 |
| 4,626,892 | 12/1986 | Nortrup et al. | 358/21 |
| 4,679,067 | 7/1987 | Belmares-Sarabia et al. | 358/29 |
| 4,710,800 | 12/1987 | Fearing et al. | 358/22 CK |
| 4,727,412 | 2/1988 | Fearing et al. | 358/22 CK |
| 4,839,719 | 6/1989 | Hemsky et al. | 358/28 |

Primary Examiner—James J. Groody
Assistant Examiner—Jeffrey S. Murrell
Attorney, Agent, or Firm—Robert E. Bushnell

[57] ABSTRACT

An automatic screen condition control circuit in a television receiver for automatically maintaining a desirable display image on a television screen having proper levels of contrast, sharpness, brightness and color. The automatic screen condition control circuit comprises a receiver for receiving image signals, a luminance manipulator for controlling the levels of contrast, sharpness and brightness of the received image signals, a chrominance manipulator for controlling the color tints and the color signals of the received image signals, a sync detector for detecting a synchronizing signal from the received image signals, an auto-brightness limiter for limiting the brightness level from the luminance manipulator, a microprocessor responsive to the auto-brightness limiter for controlling the luminance and chrominance manipulators by providing storage data representative of components of contrast, sharpness, brightness, color tint, and colors to the luminance and chrominance manipulators in order to maintain the desirable display image on a television screen.

21 Claims, 2 Drawing Sheets

AUTOMATIC SCREEN CONDITION CONTROL CIRCUIT IN TELEVISION SET

BACKGROUND OF THE INVENTION

The present invention relates to a television set, more particularly to an automatic screen condition control circuit, which controls image signals automatically according to a respective screen condition in a television set.

In general, the brightness of an image displayed on the screen of picture tube varies continuously.

However, since the proper magnitudes of some important features such as contrast, sharpness, etc. of an image on a CRT screen differ in accordance with the brightness, when the brightness of an image on a screen varies abruptly, the display conditons become worse due to the disharmony of the brightness with the contrast, etc.

SUMMARY OF THE INVENTION

The object of the present invention is to provide an automatic screen condition control circuit in a television set, which comprises a data storing circuit which stores data concerning contrasts, sharpnesses, etc with respect to the brightness, and controls the screen condition with the appropriate data whenever the brightness of the screen alters, thereby maintaining the screen in best condition.

According to the present invention, there is provided an automatic screen condition control circuit included in a television circuit composed of a receiver circuit which receives and detects an image signal, a luminance manipulating circuit which is connected to said receiver circuit and performs luminance manipulations on the image signal coming from said receiver circuit, a color manipulating circuit which is connected to said receiver circuit and performs color manipulations on the image signal from the receiver circuit, a synchronization signal detecting circuit which is connected to said receiver circuit and detects synchronization signals, an ABL block which is connected to the synchronization signal detecting circuit and said luminance manipulating circuit and controls the level of the luminance signal by means of the synchronization signal, a matrix which mixes output signals from said luminance manipulating circuit and said color manipulating circuit, and a deflection coil which is connected to said matrix, the ABL block and synchronization signal detecting circuit and deflects the electron beam according to the output from said ABL block and said synchronization signal detecting circuit, comprising a data storing circuit which stores the information concerning the screen conditions of the picture tube, a micro processor which is connected to an ABL block, a luminance manipulating circuit, and a color manipulating circuit respectively, and applies data stored in the data storing circuit both the luminance manipulating circuit and the color manipulating circuit according to the output of the ABL block.

BRIEF DESCRIPTION OF THE DRAWINGS

These and other objects, features, and advantages of the present invention will become more apparent from the following description for the preferred embodiments taken in conjunction with the accompanying drawings, in which.

DETAILED DESCRIPTION OF THE INVENTION

The present invention will be now described in more detail with reference to the accompanying drawings.

Figure 1:
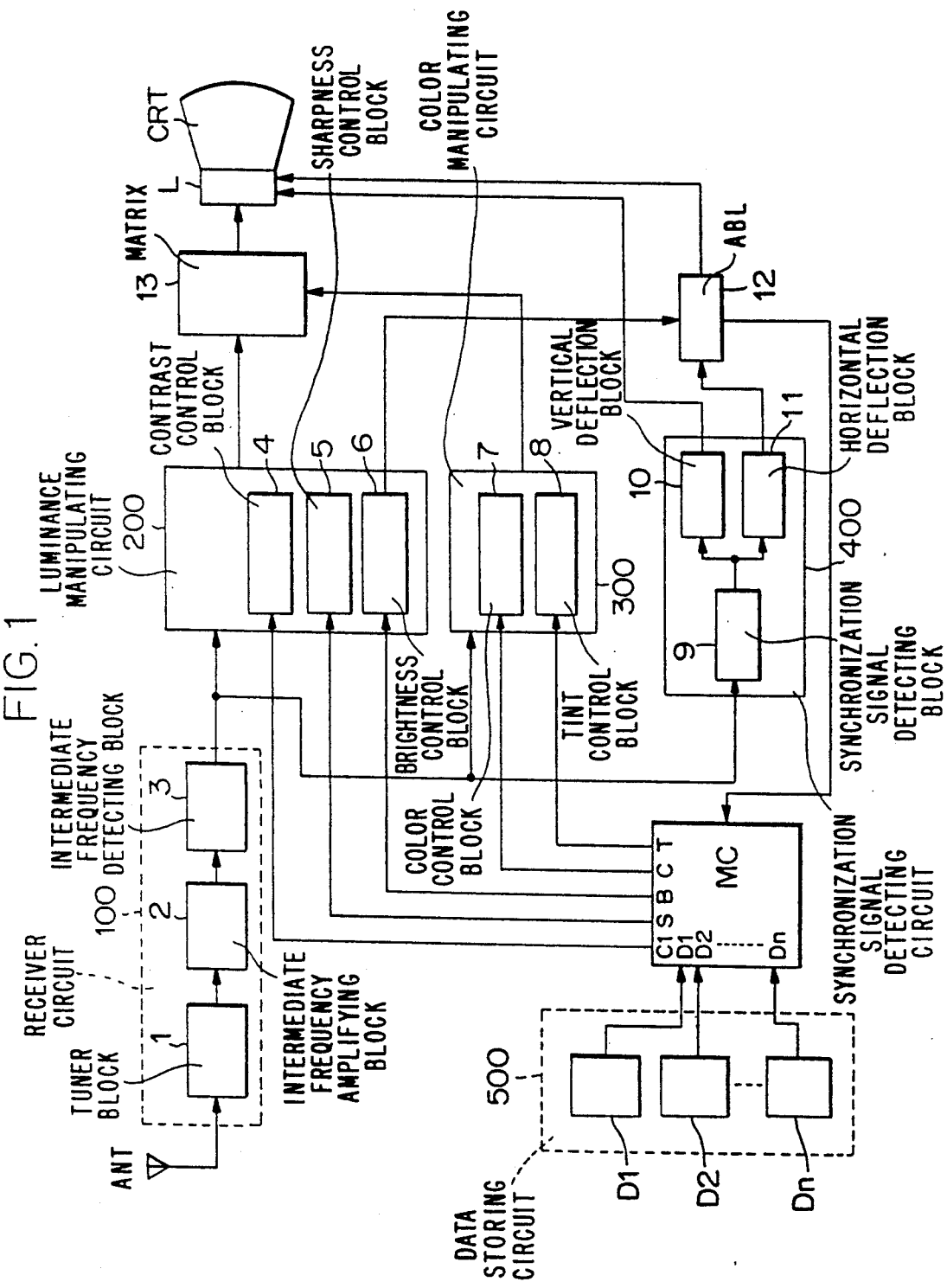
FIG. 1 is a block diagram representing the automatic CRT display control circuit in television set.

FIG. 1 is a block diagram representing the automatic screen condition control circuit in television set, which comprises the receiver circuit 100, the luminance manipulating circuit 200, the color manipulating circuit 300, the synchronization signal detecting circuit 400, the ABL block 12, the matrix 13, the data storing circuit 500, the deflection coil L, and the microprocessor (MC).

All blocks listed above except the microprocessor and the data storing circuit 500 have same functions as in a conventional television set.

More specifically, the receiver circuit 100 which receives and detects the image signal is composed of a tuner block 1 that receives a certain bandwidth of image signal, an intermediate frequency amplifying block 2 which is connected to the tuner block and amplifies intermediate frequencies, and an intermediate frequency detecting block 3 connected to the intermediate frequency amplifying block.

The luminance manipulating circuit 200 which is connected to the receiver circuit 100 and performs luminance manipulations on the image signal from the receiver circuit 100 is composed of a contrast control block 4 a sharpness control block 5 and a brightness control block 6.

The color manipulating circuit 300 which is connected to the receiver circuit 100 and performs color manipulations on the image signal from the receiver circuit 100 is composed of a color control block 7 and a tint control block 8.

The synchronization signal detecting circuit 400 which is connected to the receiver circuit 100 and detects the synchronization signal from the image signal from the receiver circuit 100 is composed of a synchronization signal detecting block 9 which is connected to the intermediate frequency detecting block 3 and detects horizontal and vertical synchronization signals, a vertical deflection block 10 which is connected to the synchronization signal detecting block 9 and deflects the image signal vertically using the deflection coil and the vertical synchronization signal, and a horizontal deflection block 11 which is connected to the synchronization signal detecting block 9 and deflects image signal horizontally using the deflection coil and the horizontal synchronization signal.

The ABL(Auto Brightness Limiter) 12 is connected to the horizontal deflection block 11 and the brightness control block 6 in the luminance manipulating circuit 200 and protects a transistor used for horizontal output from breakdown in case that luminance signal increases abruptly.

The matrix 13 is connected to the luminance manipulating circuit 200 and the color manipulating circuit 300 and produces combined luminance signal and color signal.

The deflection coil L is connected to the ABL block 12, the vertical deflection block 10 and the matrix 13 and deflects the image signal produced from the matrix 13 in accordance with synchronization signal from the ABL block 12 and the vertical deflection block 10.

The data storing circuit 500 stores information concerning display conditions on screen and comprises a number of data storing blocks (Di–Dn) which store the most appropriate luminance and color information with respect to the brightness condition.

The microprocessor MC is connected to the ABL block 12, the data storing circuit 500, the luminance manipulating circuit 200, and the color manipulating circuit 300 and applies the data stored in the data storing circuit 500 into the luminance manipulating circuit 200 and the color manipulating circuit 300 according to the output of the ABL block 12.

Figure 3:
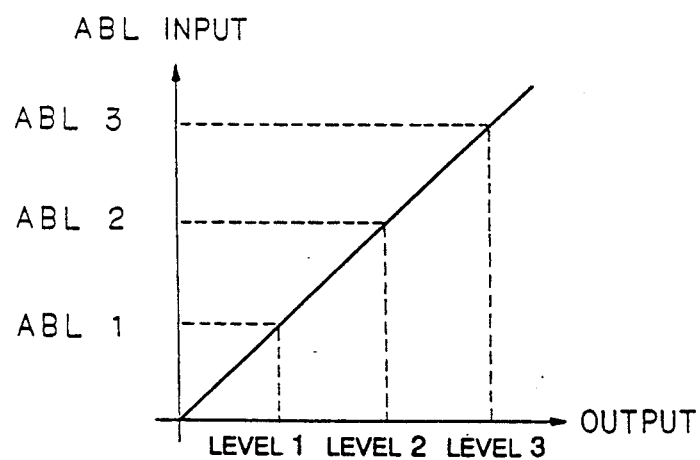
FIG. 3 is an output characteristics diagram showing the output characteristics of the automatic CRT display control circuit.

In the automatic screen condition control circuit in television set constructed as above, each of data storing blocks (Di–Dn) stores certain information such as contrast, sharpness, tint and image data, which is used to maintain a clear screen condition according to the output level of the ABL block 12 as described in FIG. 3.

The intermediate frequency of the image signal received by the tuner block 1 of the receiver circuit 100 is detected and amplified by the intermediate frequency detecting block 2 and the intermediate frequency amplifying block 3, and the amplified signal is applied into the luminance manipulating circuit 200, the color manipulating circuit 300 and the synchronization signal detecting circuit 400.

Contrast, sharpness and brightness for the image signal which is applied to the luminance manipulating block 200 is controlled and output by the contrast control block 4, the sharpness control block 5 and the brightness control block 6, respectively. Also, the color and tint for the image signal which is applied to the color manipulating block 300 is controlled and produced by the color control block 7 and the tint control block 8.

The synchronization signal detecting block 9 detects the vertical and horizontal synchronization signals from the image signal applied to the synchronization signal detecting circuit and drives the vertical and horizontal deflection blocks 10,11 with the synchronization signals.

The ABL block 12 detects a certain level of the brightness signal from the brightness control block 6 with respect to the horizontal synchronization signal as described in FIG. 3, and an output level is applied to the microm MC.

Figure 2:
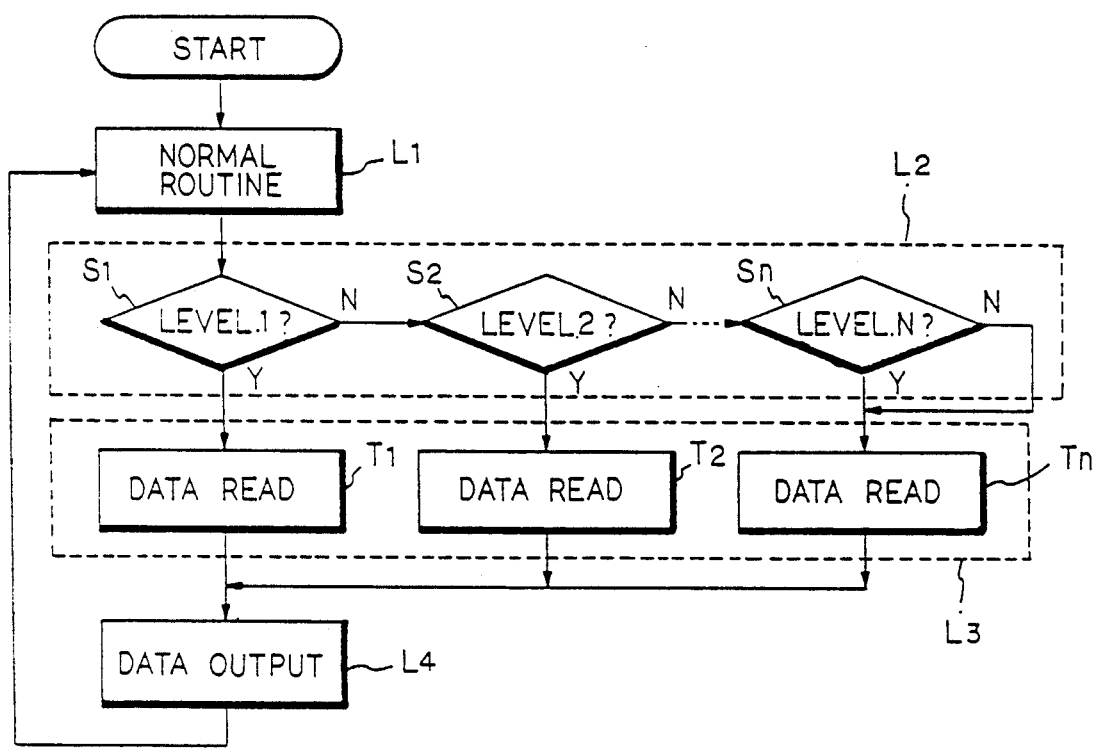
FIG. 2 is a flowchart representing the action taken by the automatic CRT display control circuit.

The microprocessor MC acts as indicated in FIG. 2, a flowchart, after receiving the output level signal from the ABL block 12.

More specifically, if the microprocessor MC is provided with a certain level of signal from the ABL block 12 while it performs its normal routine L1 for controlling CRT display, it analyzes the output level from the ABL block 12 using the decision steps S1–Sn in the decision routine L2.

Next, the microprocessor MC performs a data reading routine L3 comprising the data reading steps T1–Tn which read the data stored in the data storing blocks Di–Dn of the data storing circuit 500. Meanwhile, the data storing circuit 500 stores the image data which ar adequate for the output level chosen by the decision routine L2.

After performing the above data reading routine L3, the microprocess or MC performs a data output routine L4 which applies the read image data to the luminance manipulating circuit 200 and the color manipulating circuit 300 so that the image signals in the contrast control block 4, the sharpness control block 5, the brightness control block 6, the color control block 7, and the tint control block 8 are adjusted to the current brightness.

The luminance and color signals controlled in the luminance manipulating circuit 200 and the color manipulating circuit 300 are applied to the deflection coil L after being combined in the matrix 13. At the same time, as the vertical and horizontal synchronization signals are applied to the deflection coil L, the combined image signal produced by the matrix 13 is displayed on the screen after being deflected by the deflection coil L.

As mentioned above, a clear present invention can maintain the screen condition for a television set by controlling the luminance manipulating circuit and the color manipulating circuit using data from the data storing circuit according to the current brightness status, after storing contrast, sharpness, tint, and color image data in the data storing circuit according to the brightness signal level.

The invention is in no way limited to the embodiment described hereinabove. Various modifications of disclosed embodiment as well as other embodiments of the invention will become apparent to persons skilled in the art upon reference to the description of the invention. It is therefore contemplated that the appended claims will cover any such modifications of embodiments as fall within the true scope of the invention.

What is claimed is:

1. An automatic screen condition control circuit in a television circuit, comprising:

receiving means for receiving an image signal;

luminance manipulating means connected to said receiving means, for performing luminance manipulations on the image signal;

color manipulating means connected to said receiving means, for performing color manipulations on the image signal;

synchronization signal detecting means connected to said receiving means, for detecting synchronization signals;

auto-brightness limiting means connected to the synchronization signal detecting means and said luminance manipulating means, for controlling amplitude levels of the luminance signal in dependence upon the synchronization signal;

matrix means for mixing output signals of said luminance manipulating means and said color manipulating means; and deflection coil means connected to said matrix means, said auto-brightness limiting means and synchronization signal detecting means for deflecting the electron beam in dependence upon the output signal from said auto-brightness limiting means and said synchronization signal detecting means;

memory means for storing information concerning screen conditions of a picture tube; and processor means connected to said auto-brightness limiting means, luminance manipulating means, and color manipulating means, for applying data stored in said memory means to both the luminance manipulating means and the color manipulating means according to an output signal from the auto-brightness limiting means.

2. The circuit as claimed in claim 1, wherein said memory means stores luminance and color information of different brightness conditions.

3. The circuit as claimed in claim 2, wherein said luminance and color information comprises contrast, sharpness, tint and color image data.

4. The circuit as claimed in claim 1, wherein said memory means comprises a plurality of data storage blocks.

5. The circuit as claimed in claim 4, wherein each of said data storage blocks comprises luminance and color information for corresponding different ones of a plurality of brightness conditions.

6. The circuit as claimed in claim 5, wherein said luminance and color information comprises contrast, sharpness, tint and color image data.

7. An automatic screen condition control circuit, comprising:
   means for receiving a television signal for enabling a visual display condition by providing an intermediate frequency signal having luminance and chrominance components representative of said television signal;
   luminance manipulating means coupled to receive said intermediate frequency signal, for performing luminance manipulations on said luminance component of said intermediate frequency signal to provide luminance signals having a plurality of controllable characteristics;
   color manipulating means coupled to receive said intermediate frequency signal, for performing color manipulations on said chrominance components of said intermediate frequency signal to provide chrominance signals having at least one controllable characteristic;
   means for combining said luminance and chrominance signals to provide an image signal corresponding to said television signal for a display screen;
   synchronous detecting means coupled to receive said intermediate frequency signal, for detecting vertical and horizontal synchronizing signals from said intermediate frequency signal;
   deflector means for controlling movements of scanning beams on said display screen in dependence upon said vertical and horizontal synchronizing signals;
   auto-brightness limiting means for detecting one determining characteristic from said plurality of controllable characteristics of said luminance signal to provide a detected luminance signal representative of said determining characteristic;
   memory means for storing information corresponding to said plurality of controllable characteristics of said image signal for said visual display condition; and
   processor means responsive to said detected luminance signal, for applying the information stored by said memory means corresponding to said plurality of controllable characteristics of said image signal, to said luminance manipulating means and to said chrominance manipulating means, for controlling said visual display condition.

8. The circuit as claimed in claim 7, further comprised of said auto-brightness means detecting a brightness condition as said determining characteristic of said luminance signal.

9. The circuit as claimed in claim 8, wherein said stored information corresponding to said plurality of controllable characteristics has luminance and color aspects representing different brightness conditions.

10. The circuit as claimed in claim 9, wherein said stored information corresponding to said plurality of controllable characteristics has luminance and chrominance aspects respectively representing contrast, sharpness, brightness, color tint and color conditions.

11. The circuit as claimed in claim 8, wherein said memory means comprises a plurality of data storage blocks, each of said data storage blocks storing a corresponding image characteristic of said plurality of image characteristics of the image signal.

12. The circuit as claimed in claim 11, wherein each of said data storage blocks contains luminance and color components for corresponding different ones of a plurality of brightness conditions.

13. The circuit as claimed in claim 12, wherein said luminance and color components comprise contrast, sharpness, tint and color image data.

14. A process for maintaining a clear screen condition for a television set, comprising the steps of:
   receiving a television signal to provide an intermediate frequency signal having luminance and chrominance components;
   processing said luminance component of said intermediate frequency signal to provide a luminance signal having a plurality of controllable characteristics;
   processing said chrominance components of said intermediate frequency signal to provide a chrominance signal having at least one controllable characteristic;
   combining said luminance and chrominance signals to provide an image signal corresponding to said television signal, to a display screen;
   detecting vertical and horizontal synchronizing signals from said intermediate frequency signal;
   controlling movements of a scanning beam of said display screen in dependence upon reception of said vertical and horizontal synchronizing signals;
   detecting a brightness characteristic from said plurality of controllable characteristics of said luminance signal to provide a brightness signal;
   storing information corresponding to said plurality of controllable characteristics of said luminance and chrominance signals;
   adjusting said luminance signals and chrominance signals in response to said brightness signal in dependence upon the stored information corresponding to said plurality of controllable characteristics of said luminance and chrominance signals.

15. The process as claimed in claim 14, wherein said step of adjusting luminance and color signals further comprises the steps of:
   determining a value for the amplitude level of said brightness signal;
   reading said stored information corresponding to said value; and
   adjusting luminance signals and chrominance signals according to the corresponding stored information.

16. The process as claimed in claim 15, further comprising the step of storing luminance and chrominance components of the stored information for different brightness conditions.

17. The process as set forth in claim 16, further comprised of selecting said luminance and chrominance components from a group comprising contrast, sharpness, tint and color image data.

18. The process as claimed in claim 14, further comprising the step of storing luminance and chrominance components of the stored information for different brightness conditions.

19. The process as claimed in claim 18, further comprised of selecting said luminance and chrominance components from a group comprising contrast, sharpness, tint and color image data.

20. An automatic screen condition control circuit, comprising:
    means for receiving a television signal for enabling a visual display condition by providing an intermediate frequency signal having luminance and chrominance components representative of said television signal;
    luminance manipulating means coupled to receive said intermediate frequency signal, for performing luminance manipulations on said luminance component of said intermediate frequency signal to provide luminance signals having a plurality of controllable characteristics for a display screen;
    synchronous detecting means coupled to receive said intermediate frequency signal, for detecting vertical and horizontal synchronizing signals from said intermediate frequency signal;
    deflector means for controlling movements of scanning beams on said display screen in dependence upon said vertical and horizontal synchronizing signals;
    auto-brightness limiting means for detecting one determining characteristic from said plurality of controllable characteristics of said luminance signal to provide a detected luminance signal representative of said determining characteristic;
    memory means for storing information corresponding to said plurality of controllable characteristics of said image signal for said visual display condition; and
    processor means responsive to said detected luminance signal, for applying the information stored by said memory means corresponding to said plurality of controllable characteristics of said image signal, to said luminance manipulating means, for controlling said visual display condition.

21. The circuit as claimed in claim 20, wherein said stored information corresponding to said plurality of controllable characteristics of said image signal has luminance and chrominance aspects representing contrast, sharpness, brightness, color tint and color conditions, and said determining characteristic of said luminance signal is a brightness condition.

* * * * *